United States Patent
Jensen

(10) Patent No.: US 6,712,598 B2
(45) Date of Patent: Mar. 30, 2004

(54) MOLD BATTERY WITH IMPROVED MEMBER SEPARATION

(75) Inventor: Lars D. Jensen, Arlington, TX (US)

(73) Assignee: Superior Concrete Fence of Texas, Inc., Euless, TX (US)

( * ) Notice: Subject to any disclaimer, the term of this patent is extended or adjusted under 35 U.S.C. 154(b) by 266 days.

(21) Appl. No.: 09/946,901

(22) Filed: Sep. 5, 2001

(65) Prior Publication Data

US 2002/0061342 A1 May 23, 2002

Related U.S. Application Data

(60) Provisional application No. 60/252,018, filed on Nov. 20, 2000.

(51) Int. Cl.[7] .......................... B29C 33/26; B29C 39/02
(52) U.S. Cl. ....................... 425/234; 425/409; 425/451; 249/137
(58) Field of Search ................................. 425/233, 234, 425/385, 409, 451, 453, 454; 249/120, 126, 137; 100/195, 202, 194; 164/438, 489, 341

(56) References Cited

U.S. PATENT DOCUMENTS

| 447,804 A | 3/1891 | Wooster et al. |
|---|---|---|
| 2,131,655 A | 9/1938 | Coddington |
| 3,220,692 A | 11/1965 | Ecklund |
| 3,360,231 A | 12/1967 | Van Hezik |
| 3,511,467 A | 5/1970 | Rohrer |
| 3,519,243 A | 7/1970 | Kleiber et al. |
| 3,628,766 A | 12/1971 | Hartman |
| 3,743,235 A | 7/1973 | Shelley |
| 3,744,184 A | 7/1973 | Niemi et al. |
| 3,844,524 A | 10/1974 | Fisher et al. |
| 3,873,058 A | 3/1975 | Jeffery |
| 3,892,516 A | 7/1975 | McGrew et al. |
| 3,954,377 A | 5/1976 | Scholz et al. |
| 4,008,990 A | * 2/1977 | Hiemer et al. ............... 425/454 |
| 4,067,941 A | 1/1978 | Gaudelli et al. |
| 4,135,695 A | 1/1979 | Capdevila |
| 4,191,521 A | 3/1980 | Muldery et al. |
| 4,614,325 A | 9/1986 | Muldery et al. |

* cited by examiner

Primary Examiner—Robert Davis
Assistant Examiner—Thu Khanh T. Nguyen
(74) Attorney, Agent, or Firm—Lars D. Jensen

(57) ABSTRACT

A mold battery with provisions for separating one mold member from another by both rotating away and also translating away. A mold member comprises two wheels resting on two rails and a lower roller. While the mold member is rotated to an open angle stopped by the lower roller contacting a stop surface, yet the mold member can also be translated away by rolling along the rails. When joining mold members, a freedom of movement is provided which improves the seal. One embodiment comprises parallel guidance by wheels fixed on a common axle and turning in unison. One embodiment substitutes a fixed pin for the lower roller.

9 Claims, 9 Drawing Sheets

MOLD BATTERY WITH IMPROVED MEMBER SEPARATION

CROSS REFERENCE

This application claims priority to U.S. Provisional Patent Application No. 60/252,018 filed on Nov. 20, 2000, which is herein incorporated by reference in its entirety.

BACKGROUND

The present invention relates to the field of molding multiple products simultaneously. More particularly, this invention relates to the concrete molding of multiple panel-shaped products, arranged in an adjacent manner, commonly termed a mold battery.

A mold battery comprises multiple mold members having a generally vertically planar shape arranged side-by-side. By contacting one another at side sealing surfaces and a bottom sealing surface, and by providing an opening between opposing top edges, multiple mold cavities are created. This arrangement makes it convenient to pour one batch of concrete onto the top of the mold battery, filling many cavities simultaneously or nearly so.

The internal faces of a mold member can comprise a sculpted surface, meant to impart to the molded product an appearance which simulates stone, brick, or the like. The sculpted surface can be made of an elastomeric material, which aids in the release of the molded product and which seals well.

A complete mold battery assembly could comprise a base frame to support the weight of the mold members and panel products. The assembly could also comprise a means for clamping the mold members against one another, especially during the pouring of the concrete. This clamping means must thereafter disengage.

Mold batteries of prior art have comprised some means of guidance and support of the individual mold members, so that they can be aligned and brought together, and also later to separate the individual mold members to enable the cured products to be harvested. The molded products are often large, requiring the mold members to be large, strong, and heavy. Thus, it has posed a design problem to guide and manipulate the mold members. Prior art has addressed this problem by two general approaches: rotation and translation.

Some rotating prior art designs have used hinges at the lower corners, so each mold member rotates in a fashion similar to turning a page in a book. However, those methods have proved ineffective in practice, since it is nearly impossible to predict the desirable hinge location due to variables in the manufacturing of each mold member. It is a well-known problem that several small dimensional errors can accumulate to cause a large error, resulting in the misfit of some mold members. Rotating prior art designs often locate lower edges of the mold members very close to one another. This can make it difficult to remove the molded product. It is also probable that concrete remnants would drop into this lower crevice area. They are difficult to see and remove, and if not found would spoil the molding of the next product. Preparing the mold battery assembly for the next pour usually includes cleaning and spraying a mold release agent, which is made all the more difficult in the close confines of hinged mold members.

Translating prior art designs usually guide the mold members on wheels, bearings or slides along rails or tracks. Some translating prior art designs have included a means for keeping the mold members constantly vertical, such as by adding outrigger wheels or guides. Mold members which only translate must be moved a larger distance, 12 inches or more, for the worker to gain access for harvesting the molded panel product. Translating mold member designs have longer base frames and require additional movement and effort by the worker. Finally, some molded products have undercut shapes which prevent direct translation of the mold members altogether.

Every prior art design which has provided absolute guidance for mold members, has necessarily lacked the freedom of movement which might have improved the effectiveness of the sealing surfaces. For example, a hinged mold member might have a pivot point which provides a tight seal the top, but possibly a gap along the bottom. It is well known that elastomeric surfaces can move over passage of time, by creep or by taking a set. Therefore, a newly-fabricated prior art design might seal well at first, only to leak later.

SUMMARY OF THE INVENTION

The present invention satisfies the need for improved manipulation of the mold members by guiding the mold members in both rotation and translation, thereby dramatically improving access to the molded product and the cavity surfaces, and improving the effectiveness of the seal.

One objective of the present invention is to provide a rotating movement of a mold member to a definite and convenient opening angle position. This is accomplished by having a roller or pin come into contact with a stop surface.

Another objective of the present invention is to allow a mold member to translate, even while in the opening angle position. This is accomplished by moving on load-bearing wheels along rails, while rolling (the roller) or by sliding (the pin) along a stop surface.

Yet another objective of the present invention is to provide controlled parallel action during the translation of a mold member. More specifically, where the orientation of the mold member in a new position is substantially parallel to the orientation the mold member had at a previous position. This is accomplished by providing wheels of a substantially equal diameter, rotating in unison at each edge of the mold member.

Still another objective of the present invention is to provide freedom of movement to the mold member to improve the effectiveness of the seals. This is accomplished by supporting each member on wheels, so that sealing surfaces may self-orient when one mold member is clamped to an adjacent mold member.

These and other features, aspects, and advantages of the present invention will become better understood with regard to the following description, appended claims, and accompanying drawings.

BRIEF DESCRIPTION OF THE DRAWINGS

The following drawings describe the present invention.

REFERENCE NUMERALS USED IN THE DRAWINGS

Figure 1:
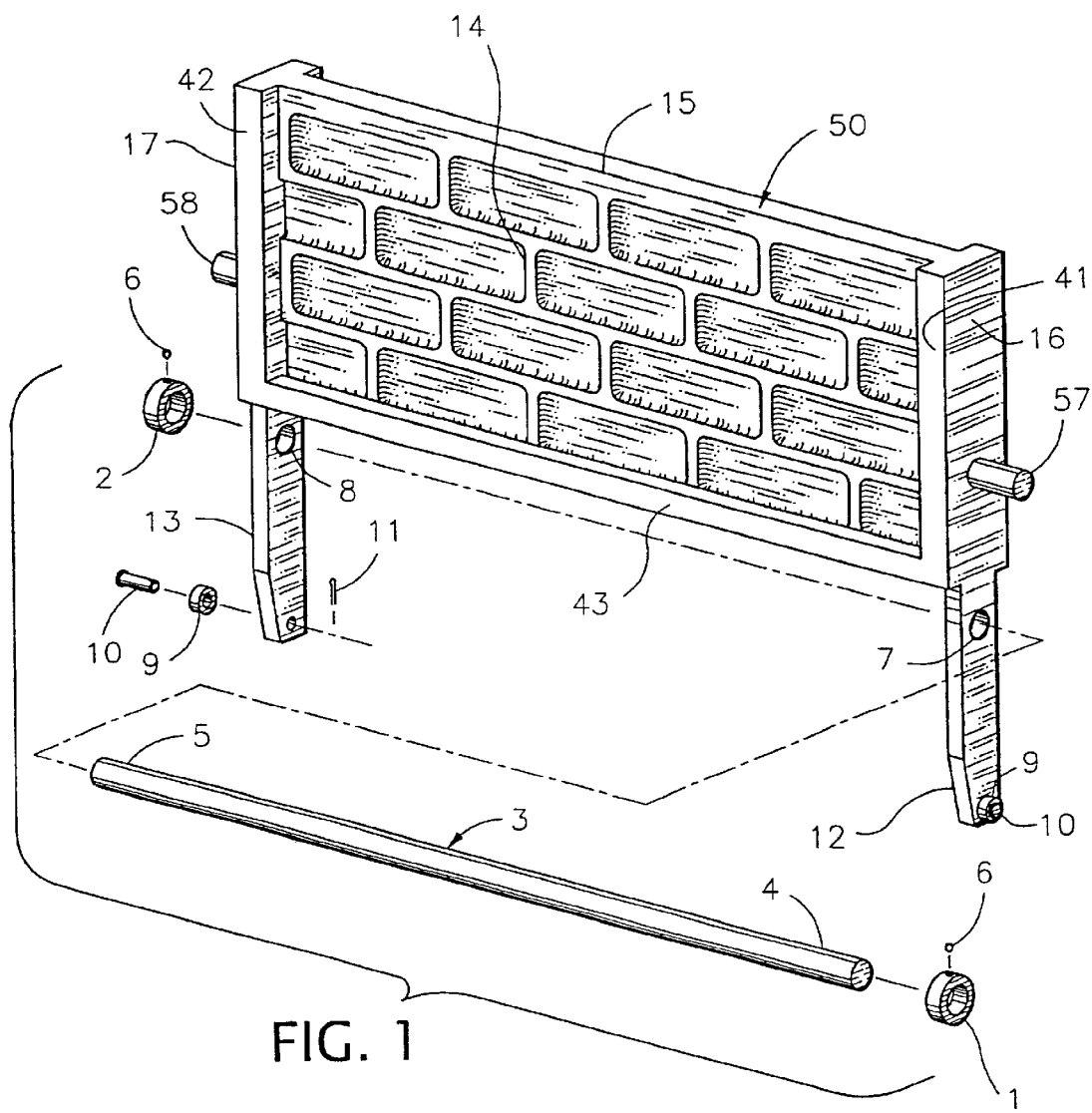
FIG. 1 is an exploded view of a mold member according to the present invention.

The following is a description of the referenced parts:
P1. molded product
P2. molded product
P3. molded product lip
1. first wheel
2. second wheel
3. axle
4. Near end
5. far end
6. set screw
7. opening
8. opening
9. roller
10. headed pin
11. cotter pin
12. near arm
13. far arm
14. mold cavity surface
15. upper edge
16. near edge
17. far edge
18. upper edge
19. roller
20. mold member
21. first wheel
22. second wheel
23. axle
24. cotter pin
26. mold member
27. central arm
28. middle beam
29. stop surface
30. pin
31. opening
32. arm
33. stop surface
34. pin
35. top surface
36. wheel
37. mold member
38. mold member
39. opening angle
40. translation direction
41. near side seal
42. far side seal
43. lower seal
50. mold member
51. mold member
52. mold member
53. mold member
54. mold member
55. mold member
56. cavity recess
57. lug
58. lug
60. near rail
61. top surface
62. stop surface
64. mold member
65. bent arm
66. stop surface
67. opening angle
70. far rail
71. top surface
72. stop surface
73. tie bar
74. hooked end
75. threaded end
76. ear
77. wing nut
78. fastener
80. base frame
81. end beam
82. end beam
83. foot
90. rotation direction
91. opening angle
92. translation direction
101. first wheel
102. second wheel
103. axle
106. set screw
114. mold cavity surface
116. nearedge
117. far edge
150. mold member
160. near rail
170. far rail

DETAILED DESCRIPTION OF THE INVENTION

A preferred embodiment of the present invention is described in FIGS. 1, 2, 3 and 4. The exploded view of FIG. 1 shows a mold member 50, having a top edge 15, a near edge 16, and a far edge 17. There is a lug 57 on the near edge and a lug 58 on the far edge. There is a near side seal 41, a far side seal 42, and a lower seal 43 An axle 3 passes through, and is free to turn in opening 7 in near arm 12 and opening 8 in far arm 13. The axle has a near end 4 on which first wheel 1 is fixed against turning by set screw 6. Similarly, the second wheel 2 is fixed against turning by another set screw 6 to the far end 5 of the axle. Attached at the lower end of each arm is a roller 9 mounted to turn freely on headed pin 10 which is secured by cotter pin 11. As shown, both the roller can turn on the headed pin, and the headed pin can rotate in the arm, but it would be equally effective if one or the other were fixed, so long as the roller is free to turn relative to the arm. The mold cavity surface 14 is shown as a brick pattern by way of example, but could be any shape suited to impart a desired texture or pattern to the molded product.

Figure 2:
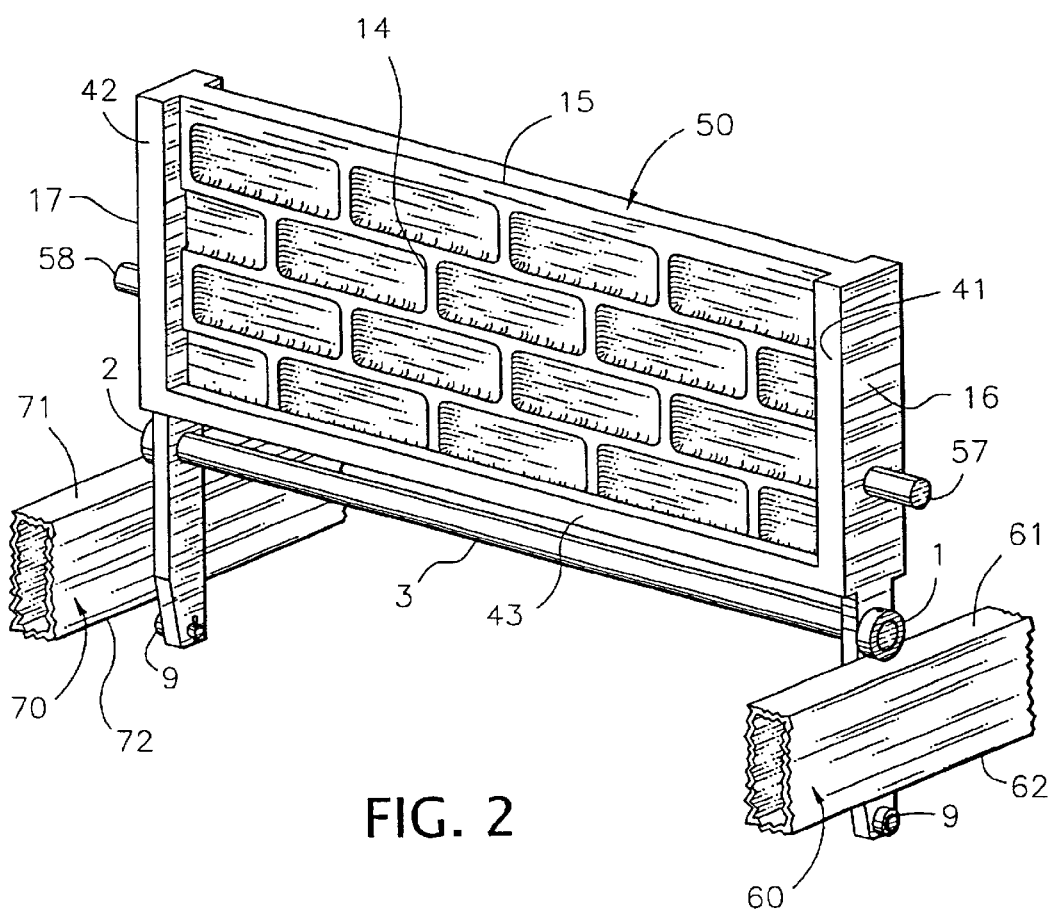
FIG. 2 is a perspective view of a mold member fitted between two rails.

FIG. 2 shows the same mold member 50 of FIG. 1, now in the assembled position, and resting upon near rail 60 and far rail 70 which are substantially parallel to one another. Ideally, the planar shape of the mold member is perpendicular to each rail. The weight of the mold member is borne by first wheel 1 bearing on the top surface 61 and the second wheel 2 bearing on top surface 71. Notice that neither of the two rollers 9 contact stop surface 62 nor stop surface 72. One can readily observe that the mold member may translate freely, rolling on the wheels along the rails. And one can readily observe that the mold member may rotate freely about the axle 3 to some non-vertical position. The freedom of these movements, and how they improve the effectiveness of the seals will be discussed later.

It is a novel feature of this embodiment of the present invention, that when the mold member 50 translates along the rails 60 and 70, it does so while maintaining perpendicularity with the rails (as viewed from above.) Described another way, at every new translated position the mold member is controlled to be parallel to an earlier position. This is because the first wheel 1 and the second wheel 2 have the same diameters and rotate in unison, since they are both fixed to a common axle 3. Then, each wheel moves each edge of the mold member the same distance. This novel action is very advantageous, since it permits a mold member to be separated manually by just one worker pushing on the near edge 16 causing the automatic moving of the far edge 17 also.

Figure 3:
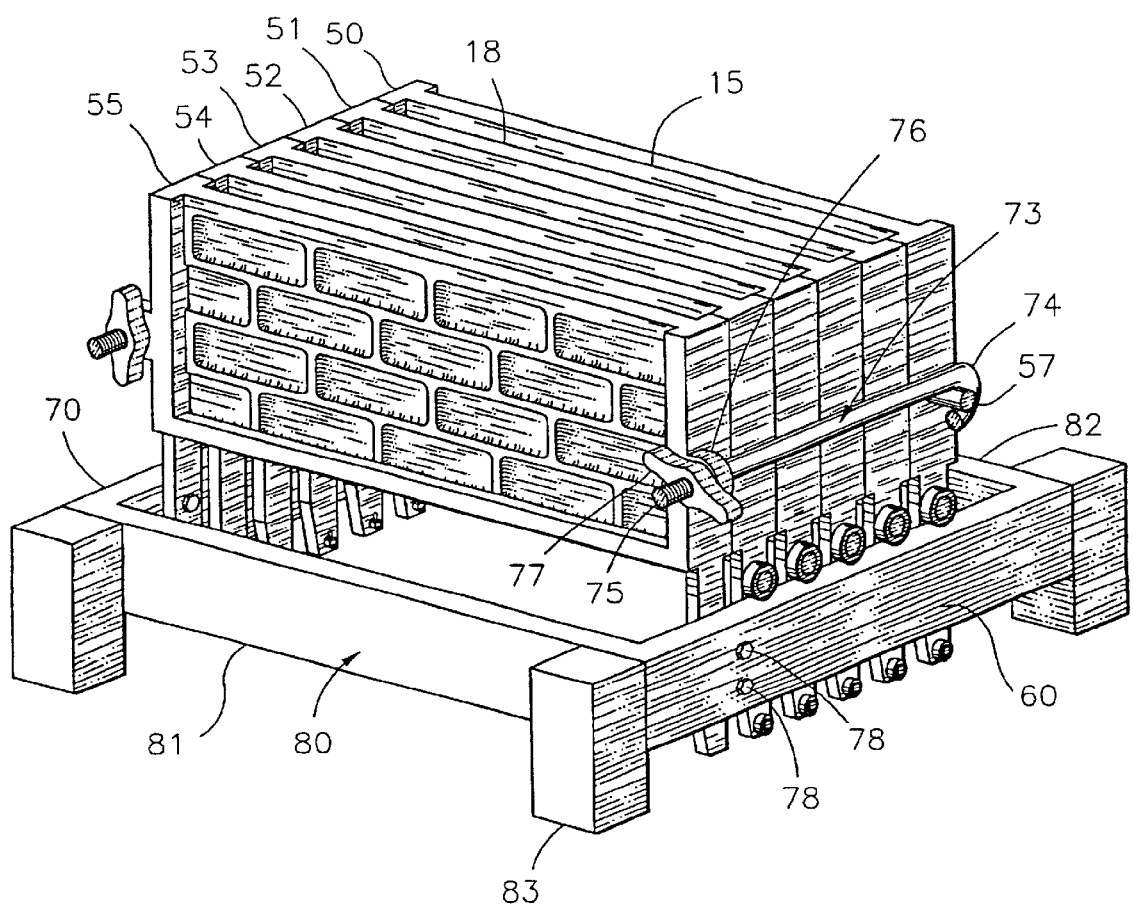
FIG. 3 is a perspective view of a mold battery according to the present invention.

FIG. 3 shows mold members 50, 51, 52, 53, 54, and 55 which are similar to one another, fitted together into a base frame 80 which comprises near rail 60, far rail 70, end rail 81 and end rail 82 all connected to generally form a rectangle supported at each corner by a foot 83. The foot is sufficiently tall to prevent the lower parts of the mold members from touching the ground. While six mold members are shown, there can be any number. It is necessary, especially during a pour, to clamp all of the mold members together, whereupon multiple mold cavity fill openings are created, such as between the top edge 15 of mold member 50 and top edge 18 of mold member 51.

Also shown in FIG. 3, the present invention benefits by the fixing of one of the mold members 55 rigidly and vertically to the base frame 80 by means of fastener 78. Fixing at least one member prevents the rest of the members from leaning over away from vertical, especially when they are all clamped together during the pouring and filling of the mold cavities. The mold member which is fixed to the base frame could be one on the end, in which case the other mold members would later separate in one direction away from that end mold member. Or, the fixed mold member could be one of the middle mold members, in which case the other mold members would separate in two directions, away from the fixed middle mold member.

The present invention comprises a clamping means to bind the mold members together prior to pouring and filling. FIG. 3 shows one version of a clamping means which comprises a tie bar 73, having a hooked end 74 and a threaded end 75. Mold member 55 has an ear 76 with an opening. The tie bar hooks over the lug 57 at one end and passes through the ear at the other end. To provide a clamping force, a wing nut 77 is turned on the threaded end. These same parts are provided at the far side (although only partially seen in this view.) By tightening each wing nut, mold members 50 and 55 are drawn together, whereupon all of the middle mold members would likewise be forced together, sealing every adjacent pair. Alternate clamping means could be comprised of a chain or cable, on two sides (or completely surrounding all of the mold members) and joining with a screw, lever, ratchet, over-the-center latch, or other well-known mechanisms for drawing a chain or cable tight. Whatever the means of clamping, it is preferable to apply the clamping force approximately ⅔ of the mold member height down from the top, in order to balance the hydrostatic forces of the pouring medium.

It is a novel feature of the preferred embodiment of the present invention that it provides freedom of movement wherein the side seals and lower seal can be drawn into intimate contact with corresponding seals on an adjacent mold member. By way of illustration, consider the circumstance where mold member 50 was not originally parallel to mold member 51, so that when the mold members are drawn together, the far side seal 42 makes initial contact with mold member 51 before near side seal 41. Now the far edge 17 stops moving and wheel 2 stops turning, resulting in wheel 1 stopped from turning. In this circumstance, the present invention specifies a clamping force which exceeds the drag force of a non-rotating wheel 1. This being the case, the clamping means will draw the near side seal 41 into contact by sliding wheel 1 on top surface 61 rather than by rolling. This drag force can easily be calculated by one knowledgeable in the field, by considering the dead weight of the mold member, and the types of materials involved.

Figure 4:
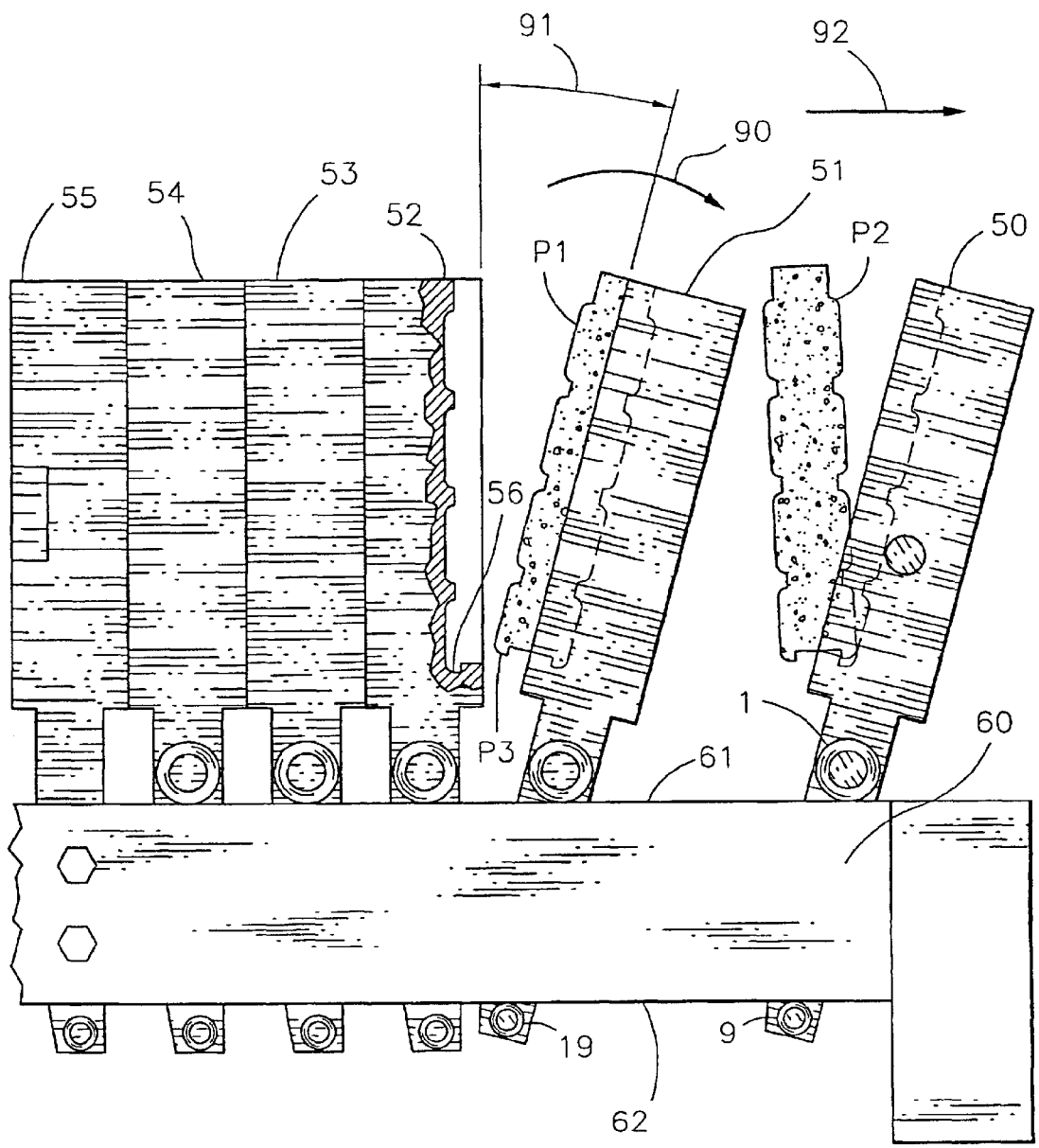
FIG. 4 is a side view of mold members separated by rotation and by translation.

FIG. 4 shows a side view of the present invention at a time after the mold cavities have been filled and the molding medium has cured and hardened into molded product P1 and molded product P2. The clamping means is not shown (having been removed) and mold member 51 is shown at new position having been rotated in the direction indicated by reference numeral 90 to an opening angle denoted by reference numeral 91. The opening angle is that angle at which roller 19 makes contact with stop surface 62. Where before, when the mold member was in the vertical orientation, the roller did not make contact.

Prior art designs which primarily translate a mold member, may include a means to hold a mold member substantially vertical. These prior art designs nonetheless may allow a mold member to tilt a small amount, due in part to the clearances and tolerances necessary to enable parts to fit together. A small amount of tilting in these prior art designs would be regarded by their inventors as undesirable but unavoidable.

The present invention distinguishes over prior art by purposefully providing a definite opening angle, which is desirable. Even a slight opening angle provided by the present invention, offers the advantage of "peeling open" the molded product from the mold cavity surface. Therefore, the present invention envisions a useful range of values for the opening angle from about 20° to about 80°.

Again looking at FIG. 4 the mold member 50 is shown at a position translated away from mold member 51 in the direction shown by reference numeral 92 by rolling on wheel 1 on top surface 61. There is theoretically no limit to the distance that a mold member could be translated, given a correspondingly long rail 60. However, there is a distance which permits convenient product removal, as shown by the position of molded product P2. Mold member 50 is shown stopped at an opening angle which is defined by roller 9 contacting stop surface 62. The present invention allows for translation to be independent of rotation, so that a mold member may be translated, then rotated; or it may be rotated, then translated. However, there is an advantage to first rotating, which can be seen by the molded product lip P3 having been released by the rotating action from the cavity recess 56.

Figure 5:
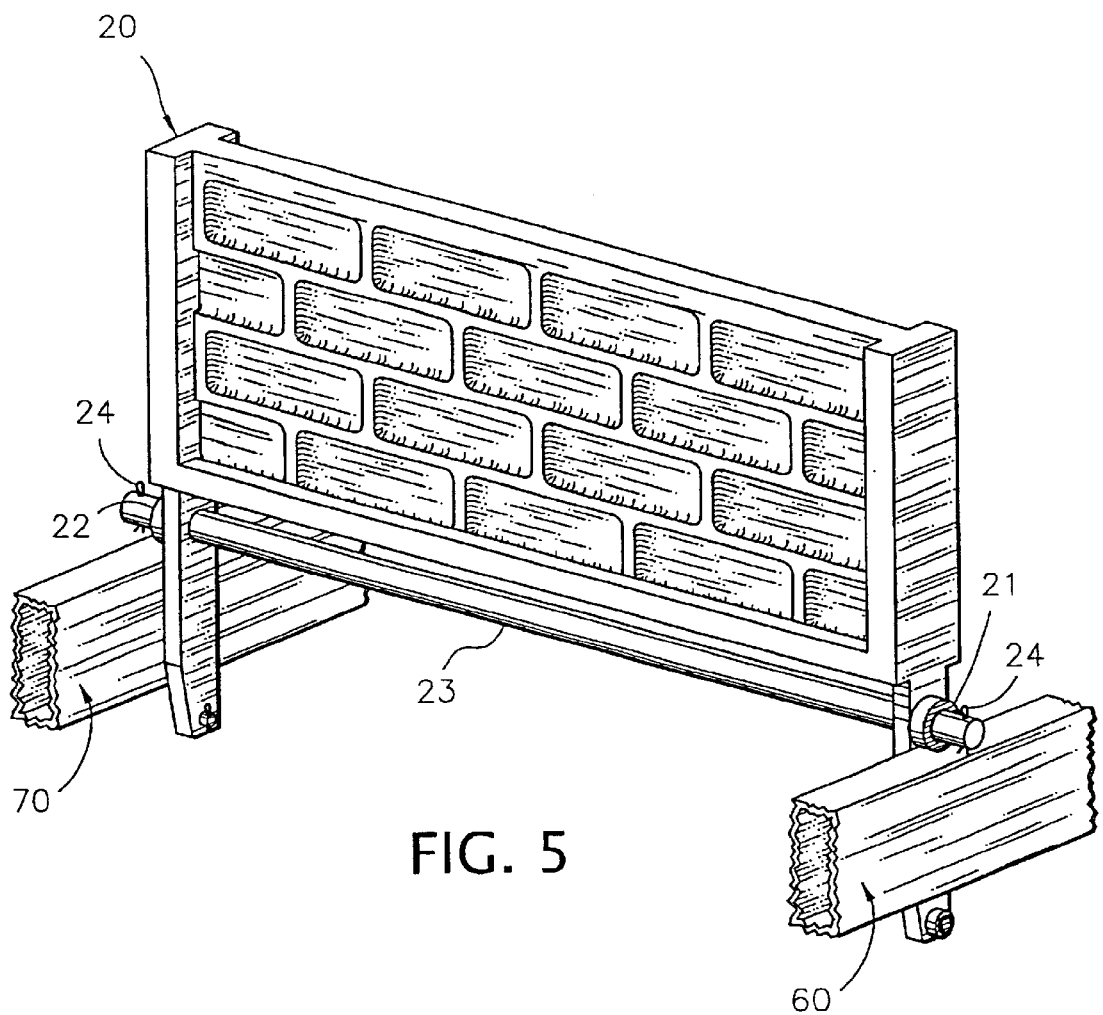
FIG. 5 is a perspective view of an alternate embodiment of a mold member having independently rotating wheels.

FIG. 5 show an alternate embodiment of the present invention which comprises a mold member 20 of similar construction to that shown in FIG. 2, but with a first wheel 21 attached to freely rotate and having a second wheel 22 attached in a way to freely rotate. This is accomplished by having an axle 23 which has a hole for a cotter pin 24 at each end. However, this embodiment could also be constructed by rotarily attaching a wheel on a fixed stub axle at the near edge, and another at the far edge. This embodiment is characterized by having wheels which freely turn independently of one other. This is not the preferred embodiment, because it does not provide the controlled parallel action previously described.

Figure 6:
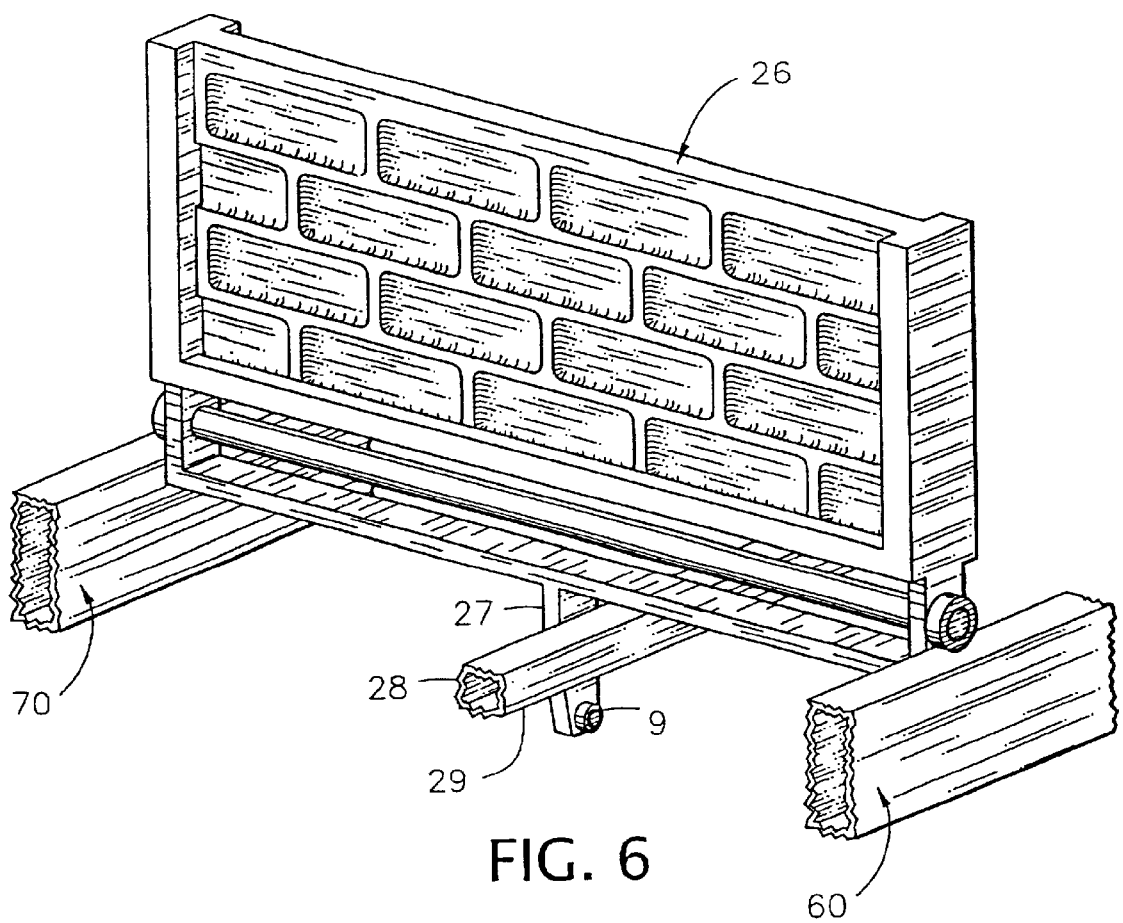
FIG. 6 is a perspective view of an alternate embodiment of a mold member having a central stop surface.

FIG. 6 shows an alternate embodiment of the present invention which comprises a mold member 26 having a central arm 27 which extends adjacent to a middle beam 28 having a stop surface 29 which is substantially parallel to rail 60 and rail 70. In this view, the planar shape of the mold member is substantially vertical and roller 9, which is attached to the central arm, does not make contact with the stop surface. In like manner to the previous embodiments, mold member 26 can be rotated until the roller makes contact with the stop surface, thus defining an opening angle. This embodiment demonstrates a stop surface which is not part of rail 60 or rail 70. Thus the present invention comprehends the structure of a stop surface which is not necessarily a feature of a rail.

Figure 7A:
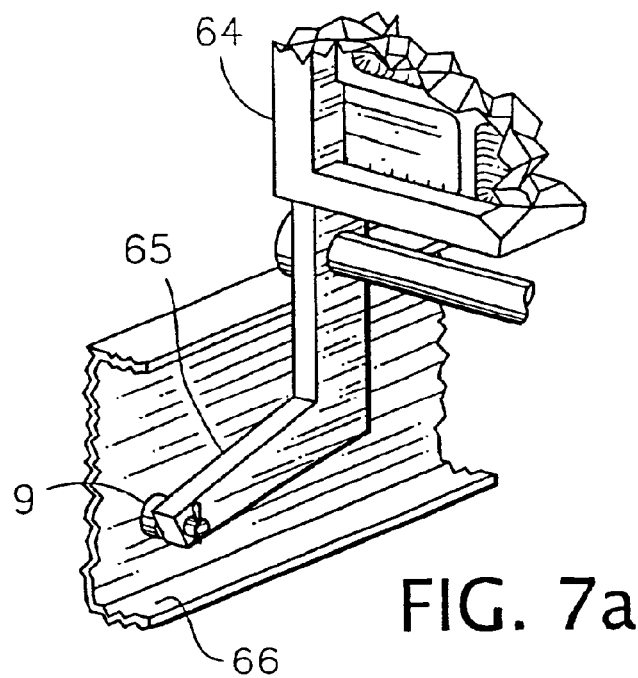
FIG. 7a is a partial perspective view of an alternate embodiment of a mold member.
Figure 7B:
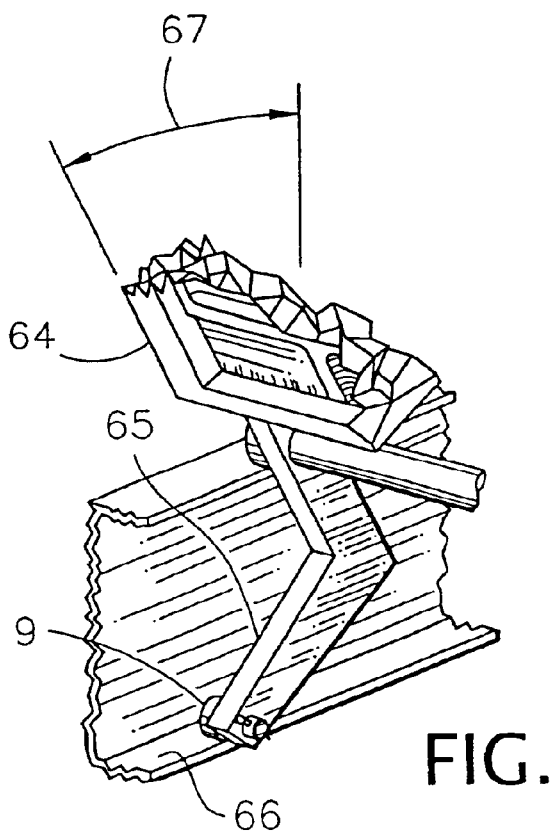
FIG. 7b is a partial perspective view of an alternate embodiment of a mold member shown at an opening angle, stopped by a top stop surface.

FIG. 7a shows an alternate embodiment of the present invention with a mold member 64 having a bent arm 65. The roller 9 does not contact stop surface 66 in this view where the mold member is vertical. Now looking at FIG. 7b. mold member 64 is shown tilted to an opening angle 67 defined by roller 9 contacting stop surface 66. This embodiment demonstrates a stop surface which is a "top" surface by comparison to the embodiment shown in FIG. 4 where the stop surface is a "bottom" surface. Therefore, the present invention comprehends these and other orientations of stop surfaces.

Figure 8A:
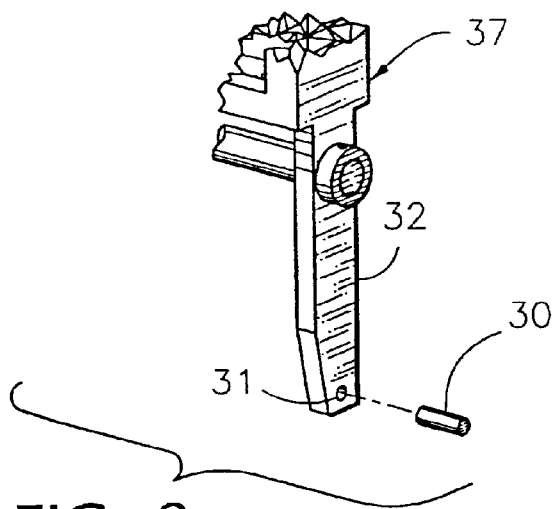
FIG. 8a is a partial exploded view of an alternate embodiment of a mold member.
Figure 8B:
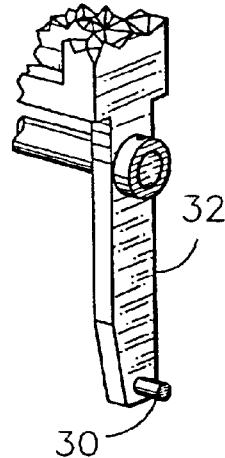
FIG. 8b is a partial perspective view of an alternate embodiment of a mold member.
Figure 8C:
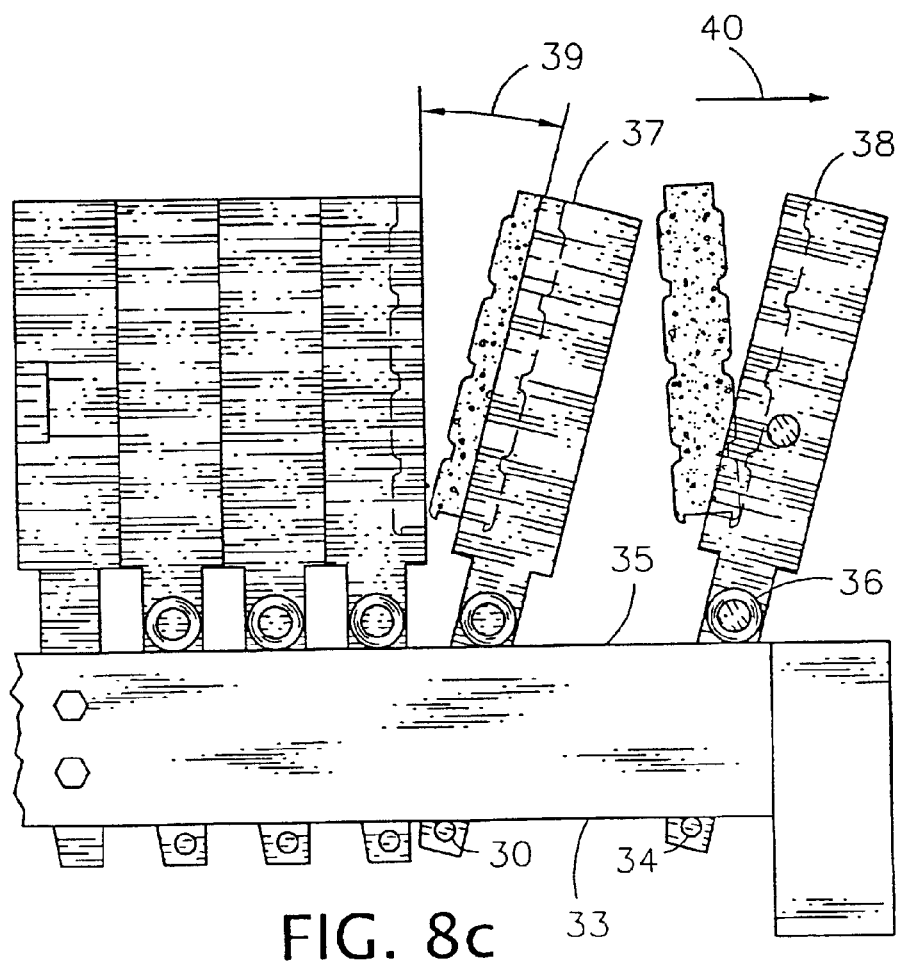
FIG. 8c is a side view of an alternate embodiment showing mold members separated by rotation stopped by a pin, and by translation by sliding on a pin.

FIGS. 8a, 8b, and 8c show an alternate embodiment of the present invention which is similar to that shown in FIGS. 1 thru 4. FIG. 8a shows a pin 30 pressed into an undersized opening 31 in arm 32 of mold member 37. Thus in FIG. 8b, the pin 30 is unable to rotate. Now in FIG. 8c this embodiment can be seen to operate in exactly the same way as that embodiment described in FIG. 4, where pin 30 contacts the stop surface 33 thereby defining the opening angle 39 of mold member 37. Similarly, mold member 38 is shown having rotated and translated in the direction noted by reference numeral 40 away from mold member 37 by rolling on wheel 36 on top surface 35 and by the sliding of pin 34 on the stop surface 33. This is not the preferred embodiment, because there is more resistance to translating movement due to the sliding friction of pin 34.

Figure 9:
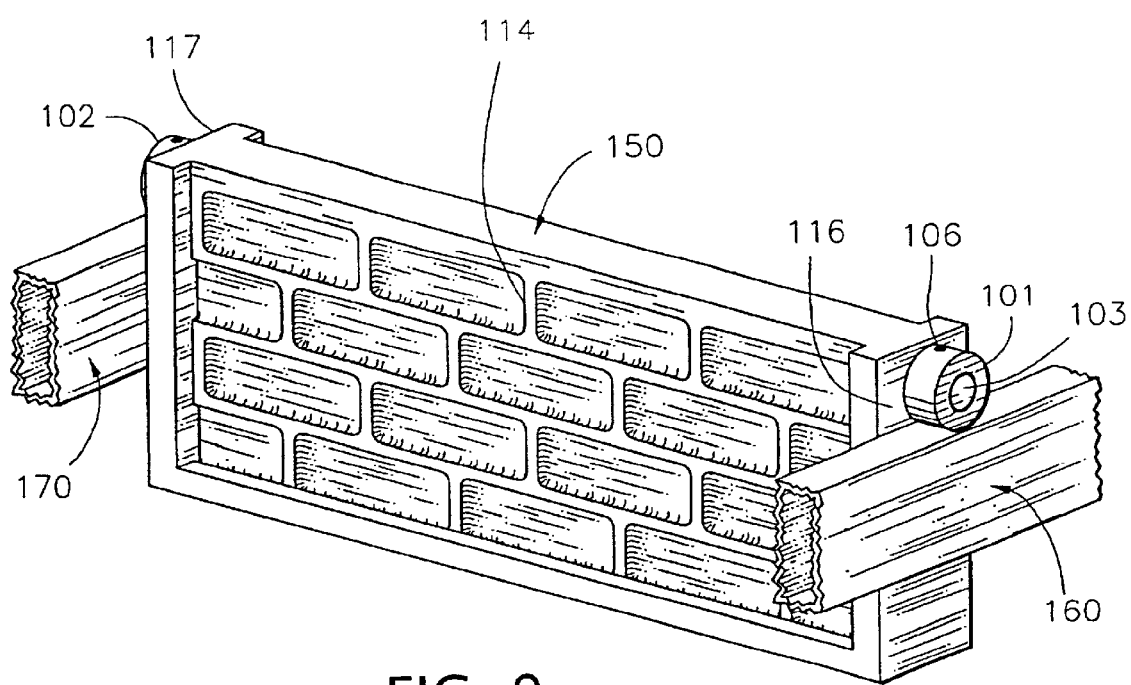
FIG. 9 is a perspective view of an alternate embodiment of a mold member having wheels and axle attached at the upper part, and having wheels which turn in unison.

FIG. 9 shows an alternate embodiment of the present invention which comprises mold member 150 which is thick enough to permit a hole (not shown) to pass from the near edge 116 through to the far edge 117 without breaking out through the mold cavity surface 114. There is an axle 103 passing through this hole and which is free to turn. The first wheel 101 is fixed by means of set screw 106 to the axle projecting near the near edge and there is a second wheel 102 similarly fixed at the other end.

When the mold member 150 translates along the rails 160 and 170, it does so while maintaining perpendicularity with the rails. Described another way, at every new translated position the mold member is controlled to be parallel to an earlier position. This is because the first wheel 101 and the second wheel 102 have the same diameters and rotate in unison, since they are both fixed to a common axle 103. Then, each wheel moves each edge of the mold member the same distance. This novel action is very advantageous, since it permits a mold member to be separated manually by just one worker pushing on the near edge 116 causing the automatic moving of the far edge 117 also. This embodiment is not the preferred embodiment because the high position of the rails obstructs access to the mold cavity surface 114.

Thus, it can now be appreciated how the present invention offers many improvements and advantages in joining, guiding, manipulating, aligning and separating the mold members of a mold battery. The applications of the present invention are not limited to concrete molding, but can also benefit molding and casting of other materials in planar and non-planar shapes. While the above descriptions and embodiments contain many specific features by way of example, they should not be construed as limitations on the scope of the invention. Many other variations are possible within the scope of the following claims.

I claim:

1. A mold battery comprising:
    a. a mold member, having generally a planar shape, having a near edge and a far edge,
    b. an axle having a near end and a far end, which is rotatably connected to said mold member, wherein the near end is near the near edge and wherein the far end is near the far edge,
    c. a first wheel having a first outside diameter, said first wheel fixed on the near end, and
    d. a second wheel having a second outside diameter, which second outside diameter is substantially equal to the first outside diameter, said second wheel fixed on the far end,
    whereby it necessarily follows that, if the near edge of the mold member is moved by rolling it on the first wheel a first distance, then the far edge moves simultaneously on the second wheel a second distance which is substantially equal to the first distance.

2. The mold battery of claim 1, which comprises:
    e. a near rail, having a first top surface on which the first wheel bears,
    f. a far rail, having a second top surface on which the second wheel bears,
    g. a stop surface, and
    h. a roller rotatably attached to the mold member wherein if the planar shape of the mold member is vertical, then the roller does not contact the stop surface, and wherein if the mold member is rotated an opening angle, then the roller contacts the stop surface, wherein the opening angle ranges between 2 and 80 degrees,
    whereby if the roller contacts the stop surface, then it necessarily follows that the mold member is stopped from rotating more than the opening angle, and whereby it necessarily follows that the mold member can translate while at the opening angle.

3. The mold battery of claim 2, comprising a clamping means, wherein if the first wheel were to be prevented from turning, then there would be a drag force resisting movement of the first wheel in sliding contact with the first top surface, wherein said clamping means applies a generally horizontal clamping force to the mold member, wherein the clamping force is greater than the drag force.

4. The mold battery of claim 1, which comprises:
    e. a near rail, having a first top surface on which the first wheel bears, f. a far rail, having a second top surface on which the second wheel bears, g. a stop surface, and h. a pin fixed to the mold member wherein if the planar shape of the mold member is vertical, then the pin does not contact the stop surface, and wherein if the mold member is rotated an opening angle, then the pin contacts the stop surface, wherein the opening angle ranges between 2 and 80 degrees, whereby if the pin contacts the stop surface, then it necessarily follows that the mold member is stopped from rotating more than the opening angle, and whereby it necessarily follows that the mold member can translate while at the opening angle.

5. The mold battery of claim 4, comprising a clamping means, wherein if the first wheel were to be prevented from turning, then there would be a drag force resisting movement of the first wheel in sliding contact with the first top surface, wherein said clamping means applies a generally horizontal clamping force to the mold member, wherein the clamping force is greater than the drag force.

6. A mold battery comprising:

a. a mold member, having generally a planar shape, b. a first wheel rotatably connected to the mold member, c. a second wheel rotatably connected to the mold member, d. a near rail, having a first top surface on which the first wheel bears, e. a far rail, having a second top surface on which the second wheel bears, f. a stop surface, and g. a roller rotatably attached to the mold member wherein if the planar shape of the mold member is vertical, then the roller does not contact the stop surface, and wherein if the mold member is rotated an opening angle, then the roller contacts the stop surface, wherein the opening angle ranges between 2 and 80 degrees, whereby if the roller contacts the stop surface, then it necessarily follows that the mold member is stopped from rotating more than the opening angle, and whereby it necessarily follows that the mold member can translate while at the opening angle.

7. The mold battery of claim 6, which comprises an axle for rotatably connecting the first wheel and the second wheel to the mold member.

8. A mold battery comprising:

a. a mold member, having generally a planar shape, b. a first wheel rotatably connected to the mold member, c. a second wheel rotatably connected to the mold member, d. a near rail, having a first top surface on which the first wheel bears, e. a far rail, having a second top surface on which the second wheel bears, f. a stop surface, and g. a pin fixed to the mold member, wherein if the planar shape of the mold member is vertical, then the pin does not contact the stop surface, and wherein if the mold member is rotated an opening angle, then the pin contacts the stop surface, wherein the opening angle ranges between 2 and 80 degrees, whereby if the pin contacts the stop surface, then it necessarily follows that the mold member is stopped from rotating more than the opening angle, and whereby it necessarily follows that the mold member can translate while at the opening angle.

9. The mold battery of claim 8, which comprises an axle for rotatably connecting the first wheel and the second wheel to the mold member.

* * * * *